Inventor
Max E. Brendel

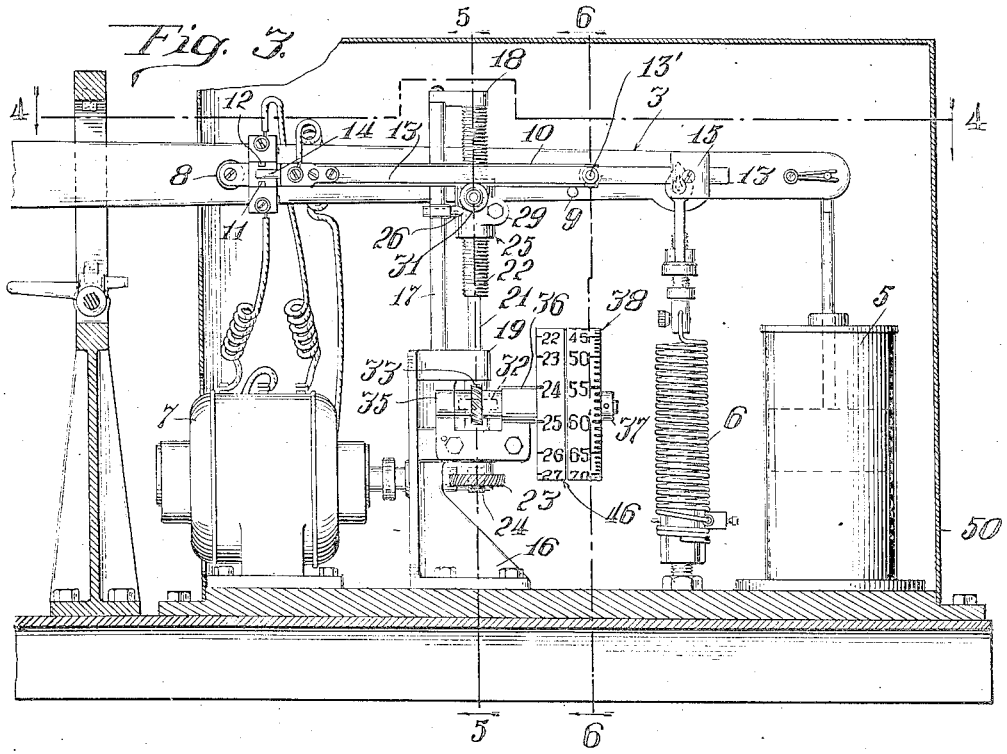

May 12, 1936.   M. E. BRENDEL   2,040,071
ELECTRICALLY CONTROLLED WEIGHT INDICATING MECHANISM FOR WEIGHING SCALES
Filed April 23, 1930   5 Sheets-Sheet 3
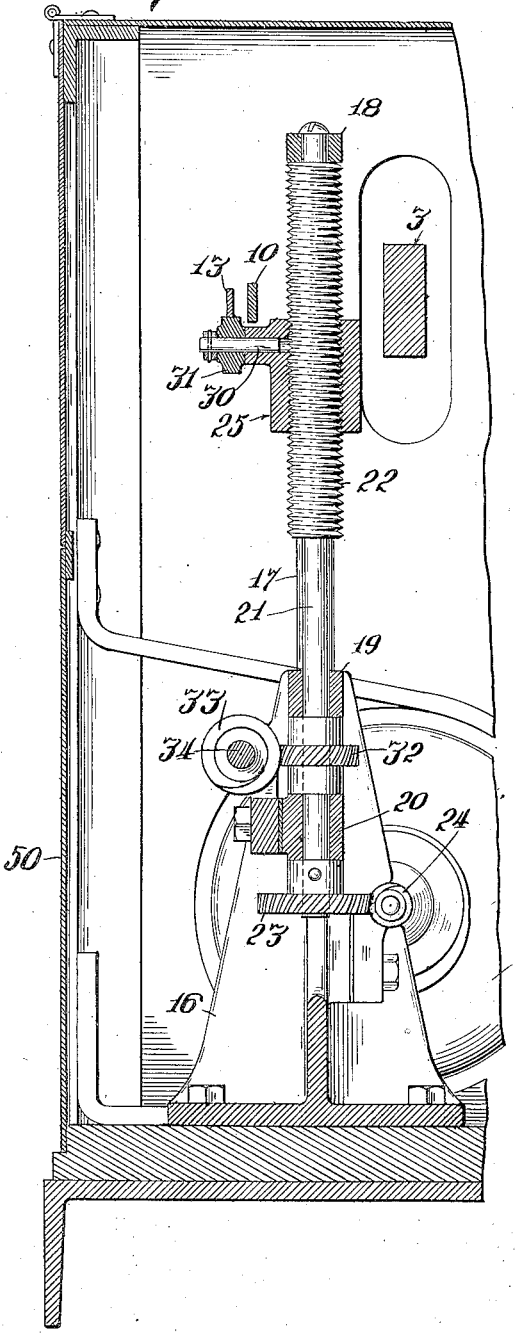
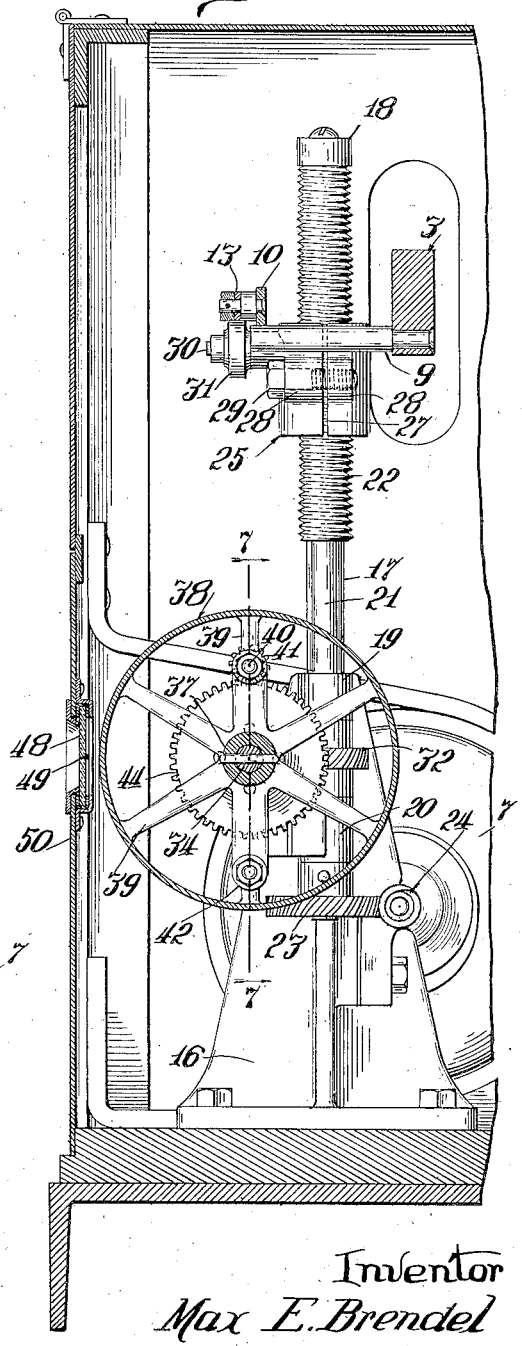
Inventor
Max E. Brendel
By Rudolph [signature]
Attorney.

May 12, 1936.　　　M. E. BRENDEL　　　2,040,071
ELECTRICALLY CONTROLLED WEIGHT INDICATING MECHANISM FOR WEIGHING SCALES

Filed April 23, 1930　　　5 Sheets-Sheet 4

Inventor
Max E. Brendel
By Rudolph
Attorney

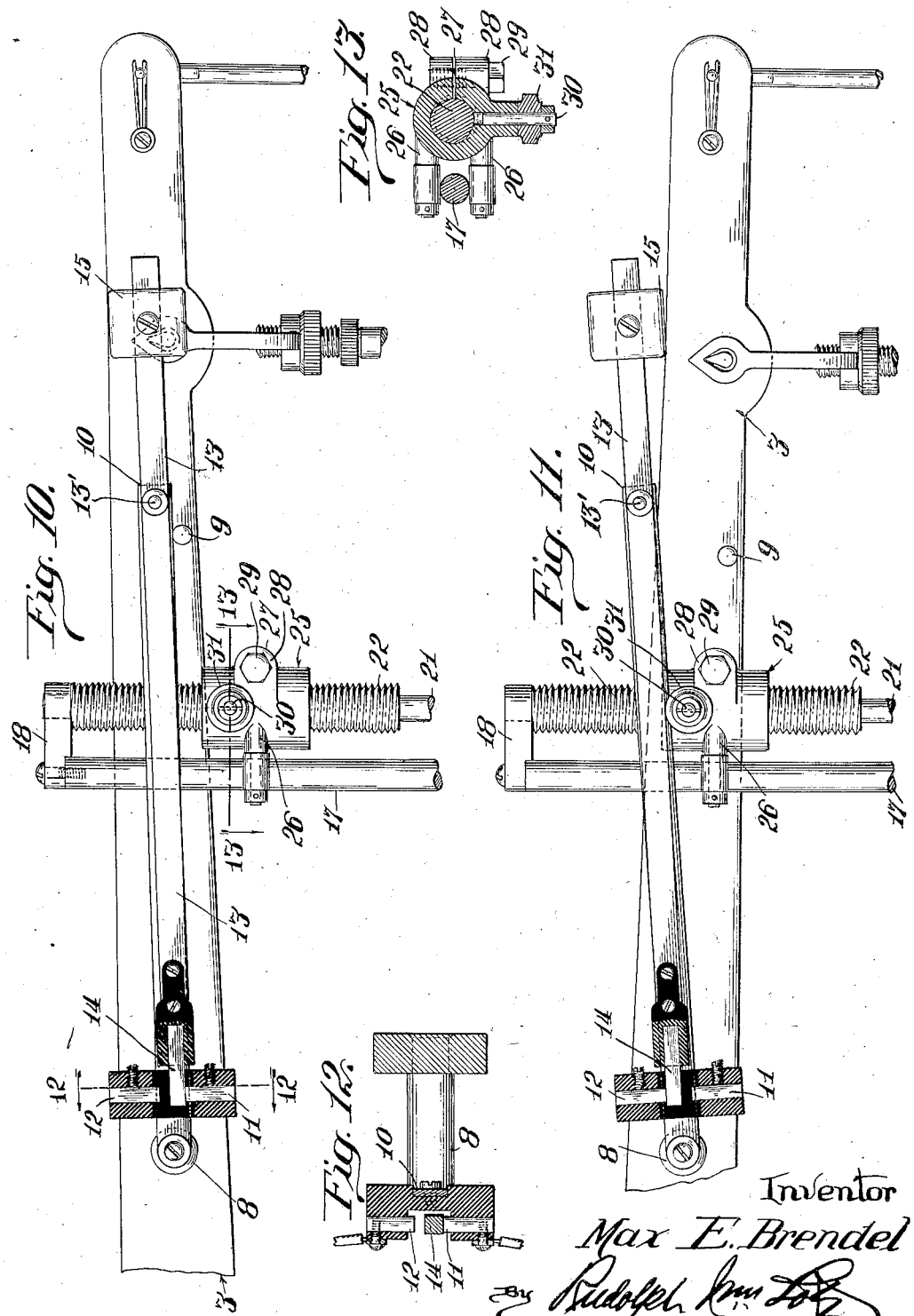

Patented May 12, 1936

2,040,071

UNITED STATES PATENT OFFICE 2,040,071

ELECTRICALLY CONTROLLED WEIGHT INDICATING MECHANISM FOR WEIGHING SCALES

Max E. Brendel, Chicago, Ill., assignor to Streeter-Amet Company, Chicago, Ill., a corporation of Illinois Application April 23, 1930, Serial No. 446,596

34 Claims. (Cl. 265—68)

In the art to which the present invention relates and, more particularly in scales of the type used for weighing heavy loads such as loaded vehicles of all types, it has heretofore been customary to associate the weight indicating mechanism, usually consisting of a relatively large diameter wheel, directly with the weight selecting or secondary beam of the scale. As the swing of the latter is arcuate and the gearing between the same and the said wheel or its equivalent is required to be as simple as possible to reduce friction to a minimum, the rotation of said wheel could not be made to correspond accurately with the swing of the beam.

The frictional resistance incident to actuation of said wheel by said beam, the necessary free play in the gearing required for reduction of friction and the momentum of the wheel have all combined to prevent the beam from accurately attaining the balance point which would accurately correspond with the scale-platform load. The inaccuracy incident to the gearing, such as a rack and pinion, between the beam and the wheel has been further detrimental in that it required the graduations of the type or indicating wheel or its equivalent to be calibrated with respect to each scale produced at the factory which constitutes a very expensive operation.

An equivalent of the wheel aforesaid is a rigid dial and an indicating hand rotatable relatively thereto. In the use of either the wheel (equivalent of a rotary dial) or the said indicating hand, a small spur-gear pinion is rigid with the rotary element and meshes with a rack-bar depending from the selective or secondary beam adjacent to or from the extremity of the longer arm of the latter. Assuming the maximum arc of swing of the said beam is only ten degrees in extent, it necessarily follows that the rack-bar must also have a very slight swinging movement. This may not be visibly appreciable but when it is considered that the diameter of the wheel or dial is about eighteen inches and the diameter of the pinion is from one-half to one inch, the slightest error in the gearing is vastly multiplied at the periphery of the wheel or dial.

The calibration of the graduated scale of the wheel or dial requires that the scale be fully set up and finely adjusted in the factory and then loaded step by step with standard iron weights. An expert draftsman is required to attend and after each such weight is added to the load already imposed upon the platform, to note position of the wheel rim with respect to a rigid coacting indicator or the position of the hand with respect to the dial, then carefully mark the wheel rim or dial and note successive positions with numerals corresponding to the known weight of load on the platform.

This work having been completed, the next step consists in drawing the graduated scale for the wheel or dial, as the case may be.

This is obviously a very expensive procedure and fails to overcome the error due to friction and lost motion above referred to.

These known quantities of error and necessity for calibration have resulted in numerous attempts to provide independently operated weight indicating means controlled by the secondary or selective beam of the scale but to date, so far as I am informed, this problem has not been satisfactorily solved except insofar as it is solved by the present invention.

From the foregoing it will be readily understood that the main general objects of the invention are:

*First.*—To provide weight indicating means for scales which are operated independently of but are controlled by the selective or secondary beam of the scale, and

*Second.*—To provide weight indicating means which are not required to be calibrated with respect to each scale but may be printed or otherwise produced in quantity in the form of graduated scales which are interchangeable and accurate for weight reading purposes.

To the aforesaid second general object may be added that of providing graduated scales which contain large and easily readable graduations and numerals and yet occupy very small space.

Aside from accuracy of weight indication as above pointed out, it is also very essential that the scale shall be operable very rapidly, that is to say, that its platform may receive loads to be weighed in as rapid succession as possible as, for example, not less than one load for every five seconds, so that obviously the successful solution of the problem presented includes that of requisite speed. In weighing scales the selective or secondary beam will, with the aid of the customary dash-pot, come to rest at the proper balance point within two to three seconds but this speed will not avail unless the weight indicating mechanism also comes to rest within the same or a not very appreciably greater time interval.

Hence, another very important object of the present invention is to provide weight indicating mechanism of the general character above indicated which will bring the weight indicating means to rest at substantially the instant or not over one or two seconds after the said beam has come to rest.

A further very important object of the invention is to provide mechanism of the type referred to which is simple in construction and operation and easy of repair, adjustment and replacement of parts.

A further important object of the invention is to provide mechanism of the type referred to which may be made in one size adaptable to scales of greatly varying capacities as, for example, scales adapted to weigh loads up to a maximum of one hundred pounds as well as scales adapted to weigh loads up to a maximum of one million pounds.

A further object of the invention is to provide weight indicating mechanism of the type referred to which is so intimately associated with the selective or secondary beam and is itself so accurate and sensitive as to reduce error of indication to the utmost practicable minimum since absolute accuracy is not attainable under the ordinary commercial uses of weighing scales.

The preferred embodiment of the invention is illustrated in the accompanying drawings wherein:

Fig. 3 is a fragmentary vertical section on a plane parallel with the scale beam of the scale showing the motor and associated operative mechanism of the scale.

Fig. 4 is a plan section on the line 4—4 of Fig. 3.

Figs. 5 and 6 are vertical transverse sections on the lines 5—5 and 6—6, respectively, of Fig. 3.

Figure 7:
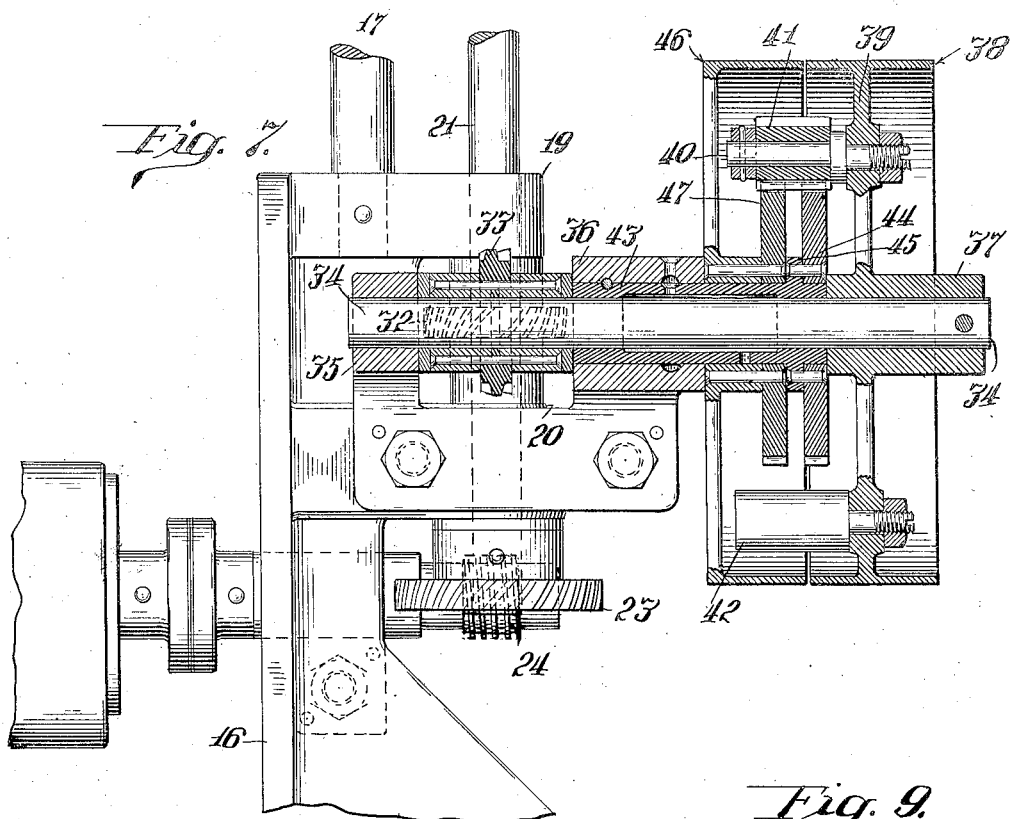

Fig. 7 is a fragmentary detail vertical sectional view on the line 7—7 of Fig. 6.

Figure 8:
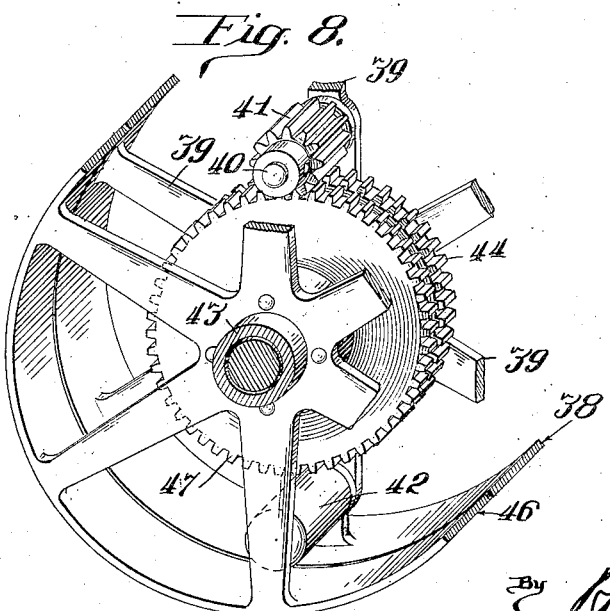

Fig. 8 is a perspective view showing the weight indicating elements of the scale.

Figure 9:
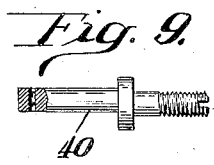

Fig. 9 is a view in side elevation, partly in section, showing the shaft of the planetary gear pinion illustrated in Fig. 8.

Figs. 10 and 11 are fragmentary side elevations showing the scale beam and motor control switch and the actuating mechanism for said switch.

Figs. 12 and 13 are detail sectional views on the lines 12—12 and 13—13, respectively, of Fig. 10.

Figure 1:
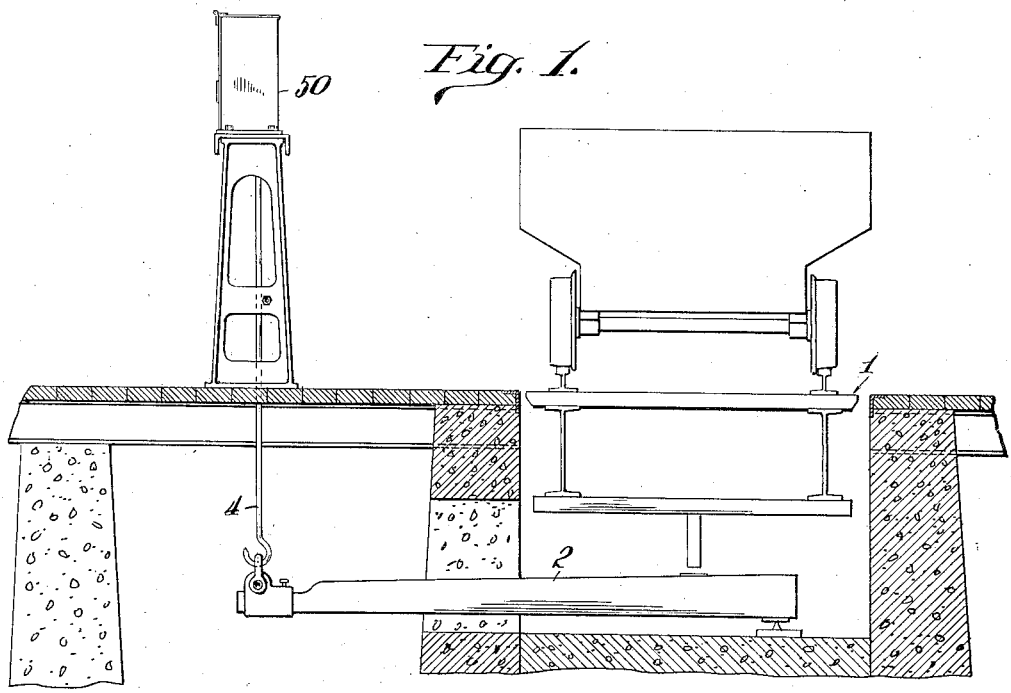
Fig. 1 is a fragmentary sectional view of the pits provided for railway scales and the like, showing, diagrammatically, a scale platform and its supporting beam and a weight indicating scale with which said beam is associated.
Figure 2:
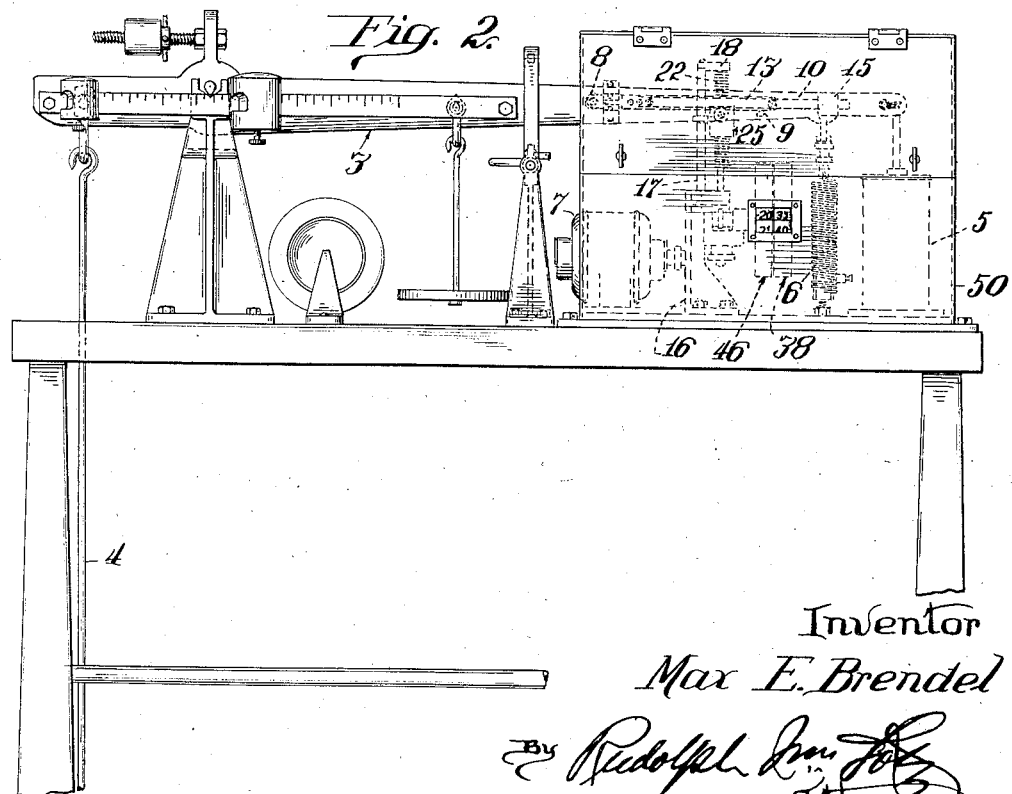
Fig. 2 is a side elevation of the electrically controlled weight indicating mechanism of a weighing scale constructed in accordance with the invention.

The scale platform 1 of Fig. 1 may be taken to be exemplary of any other type of scale platform than that used for weighing railway cars and other vehicles. The beam 2 supporting the platform 1 may be taken to be exemplary of any conventional type of scale platform supporting beam for scales of the type wherein the platform is disposed at an appreciably lower elevation than the scale beam of the weighing mechanism, the beam 2 being connected with the scale beam 3 of the weighing scale by means of the rod 4. The scale beam 3 is of a conventional type of construction, fully equipped with adjusting means and supported upon scale pivots in the conventional manner. The long end of said beam 3 is connected with the plunger of the dash-pot 5 of any well-known and efficient type and is associated with the tension spring 6 or an equivalent thereof.

The present invention resides wholly in the electrical weight indicating means for the scale which comprises the reversible type of electrical motor 7 mounted upon a portion of the frame of the scale, the motor control switch mounted upon the scale beam 3 and the motor actuated mechanism interposed between the motor and the switch lever for controlling the operation of said switch and, thereby, the operation of the motor.

On the longer end portion of said scale beam 3 there are mounted two horizontal pins 8 and 9, respectively. Pivotally secured at one end to the pin 8 at the outer end thereof, is an arm 10 which, at its other end portion is supported upon the pin 9.

Adjacent its connection with the pin 8, the said arm 10 is equipped with opposed electrical switch terminals 11 and 12, respectively, each thereof being interposed in an electrical circuit of the motor 7 which is of the reversible type so that when one of said circuits is closed, the motor armature will rotate clockwise and when the other of said circuits is closed, said armature will rotate anticlockwise.

Pivotally mounted at 13' between its ends on the end of the arm 10 which rests upon the arm or pin 9, is a lever 13 which is parallel with the arm 10 and is equipped at one end with an electrical switch-member 14 which is disposed between said terminals 11 and 12 for alternately closing the respective electrical circuits through the motor. The maximum spaces separating the respective terminals 11 and 12 from said switch-member 14 is very narrow for reasons hereinafter explained.

An adjustable counter-weight 15 on the other end of the lever 13, which will be hereinafter termed the "switch-lever", practically counterbalances the weight of the longer end of said lever, said switch-member 14 being normally disposed in contact with the electrical switch terminal 11 but is at all times when the scale beam 3 is at rest, supported upon a roller 31, hereinafter described, and out of contact with either of said terminals 11 and 12, this position of the switch-lever being hereinafter termed the "neutral" position.

The motor 7 controls and actuates said switch-lever 13 and normally maintains the switch-member 14 in neutral position, i. e. out of contact with either of said terminals 11 and 12 in the manner hereinafter described.

Mounted on the base plate supporting the weight indicating mechanism is a bracket 16. Rigid with the latter is a vertical guide rod 17 equipped at its upper end with a bearing 18. Journalled in the latter and in bearings 19 and 20 on the bracket 16 is a vertical shaft 21, the upper end portion of which is threaded or constitutes a screw-shaft 22. The shaft 21 is equipped at its lower end with a gear wheel 23 which meshes with a gear pinion 24 on the shaft of the motor 7, said gear elements being of the helical tooth type, although other conventional types of gearing may be substituted therefor, if desired.

Mounted on the screw-shaft 22 is a threaded sleeve 25 equipped at one side with parallel projecting arms 26, each carrying an anti-friction roller riding upon the guide-rod 17. Said sleeve 25 is split and is equipped at opposite sides of the slot 27 therein with projections 28, one of which is provided with a threaded opening for engaging the threaded shank of a set-screw 29 by means of which said sleeve may be contracted in a well-known manner to take up wear on the interengaging threads of the same and said shaft 22. Said sleeve is also equipped with a stud-shaft 30 on which a roller 31 is rotatably mounted, said roller being disposed in the vertical plane of the switch-lever 13.

The switch terminals 11 and 12 and the switch-member 14 of the switch-lever consist, preferably, of carbon, as this material has been found best adapted to the purpose and is easily and cheaply replaced. These several carbon elements may, if desired, be rendered adjustable in any well-known manner but are preferably removed and replaced when worn.

The foregoing described mechanism constitutes the complete operating mechanism aside from the weight indicating means hereinafted described.

In adjusting the scale and particularly the scale beam, the weight of the several elements carried by the longer end portion of the scale beam is taken into account so that when the scale platform is devoid of load, the scale beam will be in the proper position with its longer end portion at the lower limit of its movement or in the "zero" position with respect to the weight indicating mechanism to be later described.

As previously indicated, the switch-lever 13 is now in neutral position, the longer end portion thereof being supported upon the roller 31, with the switch element out of contact with either terminal 11 or 12.

As soon as a load is imposed upon the scale platform, the longer end portion of the scale beam 3 will swing upwardly, thus to release the switch lever 13 from support on roller 31, carrying the switch arm 10 on pin 9, whereupon the switch member 14 will close the motor circuit through the terminal 11 and cause the motor shaft to rotate in a direction to rotate the screw shaft 22 so as to cause the sleeve 25 to travel upwardly to follow-up the switch lever 13.

The upward swing of the scale beam 3 responsively to load on the scale platform is always less than that necessary to bring it to the balance point of the load because of the fact that the beam 3 is carrying all of the weight of the switch-lever 13 and the switch-arm 10 on pin 9. As the sleeve 25 travels upward and overtakes switch-lever 13, the roller 31 picks up the switch-lever 13 and absorbs some of the weight, thus allowing the beam 3 to travel on to the true balance of the load on the scale platform. The sleeve 25 follows and, at the true balance point, both the sleeve 25 and the pin 9 are in contact with the switch-lever 13 and the switch-arm 10 respectively. This relationship serves to hold the contact 14 in between the terminals 11 and 12 so that no current is fed to the motor. However, in case the motor should over-run, the sleeve 25 would be carried up far enough to cause contact 14 to engage with terminal 12, thus reversing the motor, and causing sleeve 25 to move downward until contact 14 is drawn away from terminal 11. Thus by alternate movements of contact 14 through sleeve 25, the motor will be caused to "hunt" the proper position for sleeve 25 to hold the contact 25 out of contact with both terminals 11 and 12, and will so remain until a change of load on the scale platform causes a movement of beam 3.

The dash-pot serves to so retard the swing of the scale beam that its swing beyond the point of balance in both directions is seldom very far and causes it soon to attain the balance point, the gearing between the motor shaft and the sleeve 25 being such with respect to frictional resistance that the motor shaft stops rotating almost instantly upon the opening of either of the motor circuits. In consequence of this frictional resistance, the sleeve 25 never attains a point in travel at which it interferes with the normal dash-pot resisted swing of the scale beam so that the latter comes to rest at the balance just as quickly as if the motor and the sleeve 25 were omitted, since the sole function performed by the motor and the mechanism associated therewith is to control the switch-lever 13 to bring it to neutral position and there retain it as the scale beam attains the point of balance position.

Particular attention is directed to the fact that the motor switch terminals 11 and 12 are pivotally associated with the scale beam instead of being rigid therewith to thus permit these terminals to swing responsively to the initial upward swing of the lever 13 under influence of the roller 31 as hereinabove described, this arrangement constituting a very important feature of the invention.

In the structure from which the drawings of this application were made, the switch-terminals 11 and 12 are spaced less than one-sixteenth of an inch from the switch-member 14 when the switch-lever 13 is in neutral position. The roller 31 engages the lever 13 more nearly adjacent its pivotal axis than its free end so that a very slight travel of the sleeve 25 will serve to shift said switch-member 14 from neutral to either circuit closing position or from one circuit closing position to another.

As the travel of the sleeve 25 always follows the direction of swing of the beam 3, it will be very obvious that, as the latter approaches balance position, a very slight swing of the same will serve to cause the switch-lever 13 to swing to one or other of its two circuit closing positions. The final movement of the switch-lever 13 relatively to the beam 3, from a circuit closing to neutral position, is so slight that to bring said lever to this position, the motor shaft will rotate only through very short arcs, the motor circuit being closed by jump-sparks before the switch-member 14 attains contact with the terminals 11 or 12 in approaching the latter. This sparking has demonstrated the superior practicability of carbon as opposed to metallic terminals and switch-member 14.

It will be noted that the less the limits of swing of the switch-lever, the more sensitive will be the operation of the mechanism for bringing and holding the same in neutral position. The minimum swing of said switch-lever 13 is determined more particularly by the degree of vibration to which the scale is subjected than by any other factor so that, in instances where this vibration is excessive, as in railway scales, the gaps between the terminals 11 and 12 and the switch-member 14 will be wider than in instances where the scale is not subjected to appreciable vibration. Thus, if the scale is located where there is earth vibration or vibration of its support of any other kind, such as the floor of a building, the width of the gaps between the switch-member 14 when in neutral position, and the respective terminals 11 and 12 will be no greater than is necessary to prevent jump-spark closure of either motor-circuit. In other words, the accuracy of the scale is not in the slightest degree affected by the electrical mechanism nor is the speed at which the scale beam attains the balance point so affected.

The motor of the scale also actuates the weight indicating means and insofar as the latter are disassociated from the scale beam and the frictional resistance incident to operation of said means by the scale beam is eliminated, the operation of said beam with respect to indicating the weight of the load is necessarily rendered far more accurate than is ordinarily true. In fact, in all instances in which the weight indicating mechanism, such as an indicating-hand or a rotatable type-wheel, has been directly associated with the scale beam, the accuracy of weight indications has been quite seriously affected to the extent that they have generally been a very appreciably large percentage off, either plus or minus, this being particularly true of scales adapted for weighing heavy loads such as loaded vehicles.

In the instant case, the accuracy of weight indication depends upon two factors, one being the gearing between the motor and the weight indicating means and the other the relation of maximum swing of the switch-lever 13 from neutral to either circuit closing position. The latter is the main source of error and this again is affected by the distance between the pivot of said switch-lever 13 and the switch-member 14 and also by the distance between the latter and the point of contact of the roller 31 therewith.

Assuming that the scale, in this instance, is adapted to weigh loads from zero to ten thousand pounds, and that the travel of the sleeve 25 to accord with the maximum up-swing of the longer end portion of the scale beam from the zero point to the ten thousand pound position of the scale beam requires exactly one hundred complete revolutions of the screw-shaft 22, then, obviously, each complete revolution of said shaft 22 would cause the sleeve 25 to travel a distance equal to one per cent of its total travel and, therefore, equivalent to a weight indication of one hundred pounds load on the scale platform. Hence, if the sleeve 25 carried a horizontally disposed indicating hand and the guide-rod 17 carried a vertically disposed graduated scale bearing graduations ranging from zero to ten thousand, then said hand would register with successive graduations from "0" to "100" for each successive revolution of the shaft 22 in a direction to cause the sleeve 25 to travel upwardly, and each main graduation would indicate a multiple of one hundred pounds weight of load on the scale platform. These graduations would necessarily be so closely spaced as to render practically impossible the provision of intermediate graduations for indicating fractions of one hundred pounds load, as for example, four intermediate graduations to provide five spacings for indicating twenty pounds load each, or nine such graduations to provide ten fractional spacings for indicating ten pounds load each. Such subgraduations are, however, necessary and, furthermore, it is desirable that the weight indications shall be readable at a given point with respect to a rigid indicating-hand, pointer or equivalent thereof and, to this end, the graduated weight indicating scale should move relatively to said hand, pointer or equivalent. It is also very necessary, to make accurate readings of the graduated scale or scales, that the latter shall bear as large and easily readable numerals as possible, or, in event that said weight indicating graduated scale or scales are to function also as weight recording means and said numerals consist, therefore, of printing type, then that said type be as large and easily readable as possible.

Practice has demonstrated that the only practical weight recording means adapted for weighing scales consists of a type bearing wheel or drum and a printing plunger projected against said wheel or drum. On the other hand, such wheel or drum must be of very large diameter in order that it may present a circumferential face of a sufficient length to bear, for example, one thousand graduations and one hundred numerals of sufficiently heavy-faced type to be very easily readable. In order to be sufficiently strong to bear the necessary force of impact of a printing plunger, such a type bearing wheel or drum must be fairly heavy and, consequently, will acquire very appreciable momentum responsively to the swing of the scale beam or other actuating means. This acquired momentum obviously tends to slow up the operation of the scale and to render the same less accurate than otherwise.

Hence, a very important object of the present invention lies in the provision of rotatable graduated weight-recording means or weight-recording type of such a nature, or in other words, of such small diameter and weight as will acquire less force of momentum than the rotatable means heretofore employed and which, therefore, are more easily reversed responsively to each scale beam swing and also brought to rest at a point or points accurately indicative of actual weight of the scale platform load.

Bearing in mind the aforesaid assumption that one hundred revolutions of the screw-shaft 22 will cause travel of the sleeve 25 a distance equal to the maximum swing of the scale beam from its zero to the ten thousand pound position, the following description of the operation of the weight indicating means will be easily understood.

Let us assume that the gear ratio of rotation between the motor shaft and the shaft 21 is three to one, or in other words, that the motor shaft makes three revolutions to one revolution of the shaft 21, with which shaft 22 is rigid.

The shaft 21 is equipped with a gear wheel 32 between the bearings 19 and 20. This gear 32 meshes with a gear wheel 33 on a horizontally disposed shaft 34 journalled in bearings 35 and 36 carried by the bracket 16.

Keyed to the shaft 34 is the hub 37 of a drum 38. A spoke 39 of this drum carries a stud-shaft 40 on which a planetary spur-gear pinion 41 is rotatably mounted. A counter-weight 42 for balancing the weight of this stud-shaft and gear pinion is mounted on another spoke diametrically opposite said pinion.

Rotatable on the shaft 34 between the hub 37 and the hub of the gear wheel 33 is a sleeve 43 which is rigid with the bearing 20 and carries the spur-gear wheel 44 which is keyed to the annular flange 45 of said sleeve and meshes with the said planetary gear pinion 41, said gear wheel 44 being non-rotatable.

Rotatable on said sleeve 43 is the hub of a second drum 46 and keyed to said hub is a spur gear wheel 47 also meshing with the said planetary gear pinion.

The spur gear wheels 44 and 47 have different numbers of teeth which, in the instance illustrated, we can assume to be ninety-nine teeth on the gear wheel 44 and one hundred teeth on the gear wheel 47, so that during planetary travel of said pinion 41, said spur gear wheels will obviously be rotated relatively to each other. While the gear ratio in this instance is assumed to be one to one hundred, this may, obviously, be varied as desired to better adapt it to scales of larger or smaller capacity, respectively.

The gear ratio between the shafts 21 and 34 is one to one, so that the drum 38 will obviously make one complete revolution for each revolution of the shaft 21 or for each one per cent of the travel of the sleeve 25. As this length of travel of the sleeve is, as aforesaid, responsive to a one hundred pound scale platform load, the drum 38 may carry a graduated scale comprising one hundred graduations for indicating one pound each and may be equipped with relatively large face type or numerals at each tenth graduation.

The companion dum 46 is of the same diameter as the drum 38 and carries, for example, one hundred graduations each indicating one hundred pounds scale platform load. These graduations are sufficiently spaced apart to permit every one thereof to be indicated by a heavy-faced numeral or type.

The gear wheel 44 being non-rotatable and having only ninety-nine teeth, it follows that for each complete planetary revolution of the planetary pinion 41, the gear wheel 47 will be advanced through an arc of one tooth or one per cent of a revolution, this being equal to an arc of the length of spacing between two of the graduations of the drum 46. One hundred revolutions of the drum 38 are thus required to effect one complete revolution of the drum 46.

Normally, each of these drums is positioned with its "zero" graduation flush with the rigid indicator opposed to the printing plunger in instances where the latter is used. In the instance illustrated, the indicating means comprises the line 49 engraved on the transparent pane 48 disposed in the sight-opening of the housing 50.

Assuming that a load of two thousand seven hundred and seventy pounds is now imposed upon the scale platform, it follows that the scale beam 3 will move until it comes to rest at the proper balance point and that the sleeve 25 will remain correspondingly disposed responsively to a number of revolutions of the shaft 22 equal to two thousand seven hundred and seventy divided by one hundred or twenty-seven and seven-tenths revolutions. Thus the drum 38 will have completed twenty-seven and seven-tenths revolutions and the drum 46 will have rotated through an arc equal to twenty-seven and seven-tenths per cent (27.7%) of a complete revolution. This would cause its indicating numeral "twenty-seven" ("27") to become most nearly disposed to the line 49 and the graduation numeral "seventy" ("70") of the drum 38 to become disposed on said line 49 so that the combined readings of the two numerals would be "two thousand seven hundred and seventy" ("2,770"), subject to fractional error which practice has demonstrated will not exceed one-tenth of one per cent. This fractional error may be reduced by increasing the distance between the point of contact of the roller 31 and the switch-member 14, but in practice, an error of this degree is sufficiently low to be entirely satisfactory for all practical purposes as absolute accuracy of any weighing scale is probably unattainable. Furthermore, a reduction of error below one-tenth of one per cent is absolutely impracticable except in isolated instances in which the mechanism is not subjected to ground vibration of any appreciable degree.

It will be understood and appreciated, of course, that the type of gearing between the drums 38 and 46 herein illustrated and described, may be replaced by any other suitable type or kind of gearing and also that in weighing scales for weighing loads up to five hundred thousand or even a million pounds, the number of cooperating drums such as 38 and 46 may be increased without departing from the invention as defined in and by the appended claims.

It will also be appreciated that the electric wires connecting the switch-terminals 11 and 12 and switch-member 14 with the source of current and the motor, respectively, will be arranged for such ease of flexing as will not even slightly effect the operation of the scale.

The weight indicating mechanism of this invention may obviously be incorporated into existing scales, though from the standpoint of cost, it may be more readily and advantageously incorporated in new scales.

I claim as my invention:

1. A weight indicating mechanism for weighing scales including a reversible motor, a motor control switch mechanism mounted upon an operative load-actuated element of the scale structure, a gravity actuated switch-lever operatively associated with said switch and said element, and a member actuated by the motor and normally engaged with said switch-lever to maintain the same in neutral position.

2. A weight indicating mechanism of the type set forth including a reversible electric motor having operating circuits, a motor control switch mechanism including switch terminals mounted upon an operative load-actuated element of the scale structure, a switch-lever operatively associated with said switch and said element and normally in contact with one of the switch terminals to close one of the motor circuits, and a motor actuated member normally engaged with said switch-lever to maintain the same in neutral position.

3. A weight indicating mechanism for beam scales including a reversible electric motor having operating circuits, a motor control switch mechanism mounted upon a beam of the scale structure, said mechanism having a gravity actuated switch-lever normally positioned to close one of the motor circuits, and a motor actuated member normally engaged with said switch-lever to maintain the latter in neutral position.

4. A weight indicating mechanism for beam scales including a reversible electric motor having operating circuits, a motor control switch mechanism including switch terminals pivotally mounted upon a beam of the scale structure and normally maintained in a predetermined position thereon, a switch-lever operatively associated with said switch and said beam and normally in contact with one of the switch terminals to close one of the motor circuits, and a motor actuated member normally engaged with said switch-lever to maintain the same in neutral position.

5. A weight indicating mechanism for beam type weighing scales including a reversible electric motor mounted upon a rigid support, a motor control switch mechanism mounted upon an operative beam of the scale structure, a switch control lever pivotally mounted on said beam and normally positioned to maintain one of the motor circuits closed, a motor actuated member engaged with said lever for normally maintaining both motor circuits open and coacting with said beam to actuate said lever, and weight indicating means operatively associated with said motor actuated member for weight indications corresponding with the various positions of said member.

6. A weight indicating mechanism for weighing scales including a reversible electric motor mounted upon a rigid support, a motor control switch mechanism pivotally mounted upon an operative element of the scale structure, a stop for limiting pivotal movement of said switch in one direction, a switch control lever pivotally associated with said switch and limited in pivotal movement relatively to the latter by the terminals thereof, said lever being normally positioned to maintain one of the motor circuits closed, and a motor actuated member normally engaged with said lever to maintain the same in neutral position, said member coacting with said element to actuate said switch-lever.

7. Weight indicating mechanism for a weighing scale equipped with a load responsive beam including a reversible electric motor mounted upon a rigid support, a member pivotally mounted upon the said beam, a switch mechanism carried thereby, a switch-lever pivotally mounted on said member and normally positioned to maintain one of the motor circuits closed, a reciprocable member geared to said motor and normally engaged with said switch-lever to maintain the latter in neutral position, and a stop for limiting the pivotal movement of said first-named member in one direction, said reciprocable member coacting with said beam to actuate said switch-lever.

8. Weight indicating mechanism for a weighing scale equipped with a load responsive beam including a reversible electric motor mounted upon a rigid support, switch mechanism pivotally mounted on the said beam of the scale structure for pivotal movement relatively thereto in one direction, said mechanism being normally positioned to maintain one of the motor circuits closed, and a motor actuated member normally engaged with said mechanism to maintain both motor circuits open, said member coacting with said beam to actuate said mechanism and adapted to impart, upon initial closure of the motor circuit responsively to movement of beam under the influence of scale platform load, pivotal movement to said mechanism relatively to said beam to affect thereby the normal balance of the latter to promote its further movement responsively to scale platform load.

9. Weight indicating mechanism for a weighing scale equipped with a load responsive beam including a reversible electric motor mounted upon a rigid support, an arm pivotally secured at one end to the longer end portion of the said beam of the scale structure, a stop-pin upon which the other end portion of said arm is supported, a switch-lever pivotally mounted upon the last-named end portion of said arm out of engaging relation to said pin, a pair of opposed terminals mounted upon the pivoted end portion of said arm and coacting with one end of said lever to close alternately the respective motor circuits, said lever being normally engaged with one of said terminals, and a reciprocable member geared to said motor and normally engaged with said lever to maintain the same in neutral position, said member coacting with said beam to operate said lever.

10. Weight indicating mechanism for a weighing scale equipped with a load responsive beam including a reversible electric motor mounted upon a rigid support, an arm pivotally secured at one end to the longer end portion of the said beam of the scale structure, a stop-pin upon which the other end portion of said arm is supported, a switch-lever pivotally mounted between its ends upon the last-named end portion of said arm out of engaging relation to said pin, a counter weight on one end portion of said lever, a pair of opposed terminals mounted upon the pivoted end portion of said arm and coacting with the other end of said lever to anternately close the respective motor circuits, said last-named end of said lever being normally in contact with one of said terminals, and a reciprocable member geared to said motor and normally engaged with said lever to maintain the same in neutral position, said member coacting with said beam to operate said lever.

11. A weight indicating mechanism for a weighing scale equipped with a load responsive beam including a reversible electric motor mounted upon a rigid support, a motor control switch mechanism mounted upon said beam of the scale and including a switch-lever normally positioned to maintain one of the motor circuits closed, said beam adapted to swing responsively to scale platform load through an arc determined by loads ranging from a zero to a predetermined maximum scale platform load position for balance at a point determined by such maximum load, a screw-shaft geared to said motor, a rotary weight indicator geared to said motor for rotation in unison, a non-rotatable sleeve engaged with said screw-shaft for reciprocation thereby and normally engaged with said switch-lever for maintaining the same in neutral position, the threads of said shaft being arranged with respect to said indicator to cause said sleeve to move a distance corresponding with the travel of the said lever with said beam during swing of the same from said zero to maximum load position as said indicator completes one revolution.

12. Weight indicating mechanism for a weighing scale equipped with a load responsive beam including a reversible electric motor, a screw-shaft geared thereto, a switch member mounted on the said beam of the scale structure and having opposed terminals for the respective motor circuits, a switch-lever associated with said terminals and normally positioned by gravity to maintain one of said motor circuits closed, a non-rotatable sleeve engaged with said screw-shaft and normally engaging said switch-lever to maintain the same in neutral position, said respective motor circuits and switch mechanism being arranged to cause said sleeve to move in a direction to open the closed motor circuit, said switch and switch-lever being mounted for movement in one direction relatively to said beam to thereby prevent said sleeve from affecting the movement of said beam to balance position responsively to scale platform load.

13. Weight indicating mechanism for a weighing scale equipped with a load responsive beam including a reversible electric motor, a vertical screw-shaft geared thereto, a switch member mounted on the said beam of the scale structure and having opposed terminals for the respective motor circuits, a switch-lever associated with said terminals and normally positioned by gravity to maintain one of said motor circuits closed, a non-rotatable sleeve engaged with said screw-shaft and normally engaging said switch-lever to maintain the same in neutral position, said respective motor circuits and switch mechanism being arranged to cause said sleeve to move in a direction to open the closed motor circuit, said switch and switch-lever being mounted for movement in one direction relatively to said beam to thereby prevent said sleeve from affecting the movement of said beam to balance position responsively to scale platform load, and weight indicating mechanism operatively associated with said sleeve and coordinated with the latter to indicate the weight of the scale platform load as said switch-lever attains neutral position.

14. Weight indicating mechanism for a weighing scale equipped with a load responsive beam, comprising a reversible electric motor, a screw-shaft and weight indicating means geared to said motor, a non-rotatable sleeve engaged with said screw-shaft for reciprocation thereby, said sleeve and said means being coordinated for causing the indicated weight to correspond with the position of said sleeve between its limits of travel, an arm pivotally mounted at one end on the said beam of the scale structure, a pair of opposed terminals for the respective motor circuits mounted on said arm adjacent its pivoted end, a supporting pin on said beam for the other end of said arm, a switch-lever pivotally mounted on the last-named end portion of said arm out of engaging relation to said supporting pin and having one end disposed between said terminals for alternate engagement therewith and normally held by gravity in contact with the lower terminal, said switch-lever being disposed in the path of said sleeve and normally maintained by the latter in neutral position and said respective terminals being arranged to each close that motor circuit which will cause travel of said sleeve in a direction to effect release of contact of said switch-lever therewith to thus open said circuit.

15. Weight indicating mechanism for a weighing scale equipped with a load responsive beam, comprising a reversible electric motor, a screw-shaft and weight indicating means geared to said motor, a non-rotatable sleeve engaged with said screw-shaft for reciprocation thereby, said sleeve and said means being coordinated for causing the indicated weight to correspond with the position of said sleeve between its limits of travel, an arm pivotally mounted at one end on the said beam of the scale structure, a pair of opposed terminals for the respective motor circuits mounted on said arm adjacent its pivoted end, a supporting pin on said beam for the other end of said arm, a switch lever pivotally mounted between its ends on the last-named end portion of said arm out of engaging relation to said pin and having one end disposed between said terminals for alternate contact therewith, said lever having one end portion disposed in the path of said sleeve and being normally held by gravity in contact with one of said terminals and by said sleeve in neutral position, an adjustable counter-weight on said lever for controlling the degree of force of gravity influencing its movements independently of said sleeve and for increasing the weight of the switch mechanism, said beam being normally in balance when bearing the weight of said switch mechanism, the latter being adapted to be lifted free of said supporting pin by said sleeve upon initial swing of said beam responsively to platform load to permit free swing of the same beyond load balance position.

16. Automatic weighing apparatus comprising in combination, a scale, load indicating mechanism, a motor for driving said indicating mechanism, a movable load responsive member associated with the scale and actuated thereby to assume a position corresponding to the load on the scale, a motor controlling device associated with said load responsive member to cause said motor to drive said indicating mechanism in either direction to a position corresponding with that assumed by said load responsive member, and means connecting said controlling device with said load responsive member to permit the latter freely and immediately to assume a position corresponding to the load on the scale and independently of the position of said indicating mechanism.

17. Automatic weighing apparatus comprising in combination, a scale, load indicating mechanism, a motor for driving said indicating mechanism, a load responsive beam actuated by the scale to assume a position corresponding to the load on the scale, a motor controlling switch mechanism actuated by said beam to cause the motor to drive said indicating mechanism to a position corresponding to that of said beam and thereby to indicate the load on the scale, and a switch actuating member connected with said beam so as to allow the latter to move freely in response to the scale load independently of said controlling switch.

18. Automatic weighing apparatus comprising in combination, a scale load indicating mechanism, a motor for driving said indicating mechanism, a movable load responsive member associated with the scale and actuated thereby to assume a position corresponding to the load on the scale, a travelling member driven by said motor to positions corresponding to those assumed by said load responsive member, a motor controlling switch mechanism associated with said travelling member and a switch actuating lever pivotally connected with said load responsive member to leave the latter free to move in full response to an imposed load independently of and without interference by said controlling switch.

19. In a measuring instrument, a load responsive member movable to a position representing the weight of the load, load indicating means disassociated from said member, a reversible electrically actuated means for actuating said indicating means, electric circuits controlling said electrically actuated means, switch mechanism controlling said circuits controlled by said load responsive member and maintained in position to close one of said circuits, said switch mechanism being mounted to allow said load responsive member to move immediately and freely in response to the load to load balancing position without restraint from said switch mechanism, and a member actuated by said electrically actuated means for actuating said switch to open the closed circuit and normally maintain said switch in neutral position when the load responsive device is in load balancing position, thereby to cause said electrically actuated means to remain inactive as said first-named member attains load balancing position, and mechanism between said electrically actuated means, said indicating means and said switch operating member to cause the latter and said indicating means to operate in unison.

20. In weighing apparatus of the character described comprising in combination a movable load counterbalancing member, independent load indicating mechanism including an element movable to a position representing the weight of the load, a reversible electric motor and operating circuits for driving said mechanism and said element, a switch having a pair of closely adjacent contacts for controlling said motor, switch operating mechanism having a contact device movable between said contacts to make and break the motor circuits, said mechanism including a lever for operating said contact device, said lever being controlled by said member and said element to make and break said circuits for deviation of said element from its said position by an amount less than the unit reading of said indicating mechanism.

21. In weighing apparatus of the character described comprising in combination a movable load counterbalancing member, independent load indicating mechanism including an element movable to a position representing the weight of the load, a reversible electric motor continually connected to said indicating mechanism and motor operating circuits for driving said mechanism and said element to said position, a switch having a pair of closely spaced contacts connected with said circuits for controlling said motor, and switch operating mechanism controlled by both said member and said element as the latter approximates said position.

22. Weighing apparatus of the character described comprising in combination a load responsive member movable to a position representing the weight of the load, a weight indicating device, a reversible motor for actuating said weight indicating device, a switch having a pair of contacts and circuits for controlling said motor, said switch having a movable switch contact member operating between said contacts and controlled by the movements of said load responsive member, said contacts being arranged closely adjacent said contact member so as to require only a very small movement of the latter to pass from one contact to the other, and means for multiplying in said contact member the increments of movement of said load responsive member to render said switch sensitive to extremely slight deflections of said load responsive member.

23. Weighing apparatus of the character described comprising in combination weight indicating mechanism, a reversible electric motor for driving said mechanism, motor operating circuits, a member movable to a position representing the weight of the load, a reversing switch device mounted upon said member for controlling said motor and including a gravity actuated switch lever tending normally to close one of the said circuits, and means operated by the movement of said motor under the control of said switch device for moving said lever to a position to open said circuits.

24. Weighing apparatus of the character described comprising in combination a load responsive member movable responsively to the load to be weighed to a position representing the weight of the load, load indicating mechanism, a reversible electric motor for driving said indicating mechanism, a movable element adjacent said load responsive member and driven by said motor to a corresponding position representing the weight of the load, a switch having a pair of contacts and circuits for controlling said motor, switch operating mechanism controlled by both said member and element when the said element approximates said corresponding position, said switch operating mechanism including a lever for multiplying the deviation of said element from said corresponding position and thereby adapted to render said switch sensitive to very small deviations of said element from said position corresponding to the weight of the load.

25. Weighing apparatus of the character described comprising in combination a load responsive member movable by a load to a position representing the weight of the load, a reversible motor, circuits controlling the same, switch mechanism carried by the said load responsive member, said switch mechanism including a pair of spaced contacts and a movable switch member between said contacts and adapted alternately to engage the same to control said motor, said switch member being normally in engagement with one of said contacts to maintain one of the motor circuits closed, motor actuated means adapted to engage said switch member to move the same to neutral position between said contacts, and motor actuated weight indicating mechanism to indicate the load as said switch attains neutral position.

26. In a weighing scale, a counterbalanced scale beam, a reversible electric motor mounted on the scale frame, a motor control switch mounted on the scale beam and normally automatically disposed in position to close one of the motor circuits, a switch actuating motor actuated member normally maintaining said switch in neutral position, said switch acting to close a motor circuit as it leaves one position to move to another, thereby to cause said motor actuated member to travel in a direction corresponding to that of the scale beam and restore said switch to neutral position at substantially the instant that said scale beam comes to rest.

27. A weight indicating mechanism for a weighing scale equipped with a load responsive beam including a reversible electric motor mounted upon a rigid support, a rotatable weight indicator geared to said motor, a screw-shaft geared to said motor for rotation in unison with said weight indicator, a non-rotatable sleeve engaged with said shaft for reciprocation responsively to rotations thereof, and motor control switch mechanism mounted upon said weight responsive member of the scale and including an operative element disposed for operation by said sleeve, said switch mechanism normally positioned to maintain one of the motor circuits closed and said sleeve normally positioned to maintain both motor circuits open.

28. A weight indicating mechanism for weighing scales comprising in combination, a weight responsive member, a reversible electric motor mounted upon a rigid support, weight indicating means operatively geared to said motor, motor control switch mechanism carried by said weight responsive member and normally maintaining one of the motor circuits closed, and an element geared to said motor in synchronism with said indicating means and coacting with said weight responsive member to operate said switch mechanism, said element being normally disposed in position to maintain both motor circuits open.

29. Weighing apparatus of the character described comprising in combination a scale member movable in counterbalancing the load to a position representing the weight of the load, weight indicating mechanism including an element movable in either direction to a position corresponding to that reached by said scale member, said scale member being freely movable to load counterbalancing position independently of said element, a reversible motor for operating said mechanism and correspondingly moving said element, and motor controlling means actuated by the relative positions of said scale member and said element for causing the latter to approach from either direction a position corresponding to that assumed by said scale member and to reverse its direction of movement if it passes beyond said corresponding position.

30. Weighing apparatus of the character described comprising in combination a scale member movable in counterbalancing the load to a position representing the weight of the load, weight indicating mechanism including an element for setting the indicating mechanism to indicate the weight of the load, said element being movable in either direction to a position corresponding to that reached by said scale member, said scale member being freely movable to load counterbalancing position independently of said element, a reversible motor for operating said mechanism and correspondingly moving said element, and motor controlling means responsive to the relative positions of said member and element to cause the latter to move in either direction until it comes to rest in a position corresponding to that of said member, said indicating mechanism being moved simultaneously with said element to a position indicating the weight of the load.

31. Weighing apparatus of the character described comprising in combination a scale member adapted to be moved by the load freely and immediately to a position representing the weight of the load, weight indicating mechanism including an element for setting the indicating mechanism to indicate the weight of the load, said element being movable in either direction to a position corresponding to that reached by said scale member, a reversible motor for operating said mechanism and correspondingly moving said element, and motor controlling means responsive to the relative positions of said member and element to cause the latter to move in either direction until it comes to rest in a position corresponding to that of said member, said indicating mechanism being moved substantially simultaneously with said element to a position indicating the weight of the load.

32. Weighing apparatus of the character described comprising in combination a scale member adapted to be moved freely and immediately to a position representing the weight of the load, weight indicating mechanism including an element movable to a position corresponding to that reached by said member and thereby to set said indicating mechanism to indicate the weight of the load, a reversible motor for operating said indicating mechanism and said element, and means actuated by both said member and said element for controlling said motor to move said indicating mechanism to a position indicating the weight of the load on the scale.

33. Weighing apparatus of the character described comprising in combination a scale member movable in response to the load to be weighed to a predetermined position which represents the weight of the load, a rotary weight indicator covering a range of numbers representing only a small fraction of the capacity of the weighing apparatus, said indicator being adapted to be rotated a plurality of times in traversing the entire capacity range of the weighing apparatus, a companion rotary indicator covering a series of numbers of a higher order each of which represents a single revolution of the first-named indicator, said indicators adapted together to indicate the weight, a source of power independent of that of the weighing apparatus for driving said indicators, and actuating means controlled by the weight responsive member for operating said driving means to drive said indicators in either direction to a position to indicate the weight of the load.

34. Weighing apparatus of the character described comprising in combination a scale member movable in response to the load to be weighed to a predetermined position which represents the weight of the load, a rotary weight indicator covering a range of numbers representing only a small fraction of the capacity of the weighing apparatus, said indicator being adapted to be rotated a plurality of times in traversing the entire capacity range of the weighing apparatus, a companion indicator for indicating digits of a high order in the weight of the load, and power means independent of the power of the weighing apparatus and controlled by the movements of the weight responsive member for driving said indicators in either direction to positions which indicate the weight of the load.

MAX E. BRENDEL.